United States Patent
Weitenberg

(10) Patent No.: US 12,295,291 B2
(45) Date of Patent: May 13, 2025

(54) HEADER FOR HARVESTING STALK-LIKE PLANTS WITH A PICKING GAP ORIENTED TRANSVERSELY TO THE DIRECTION OF TRAVEL

(71) Applicant: Deere & Company, Moline, IL (US)

(72) Inventor: Hubert Weitenberg, Borken (DE)

(73) Assignee: DEERE & COMPANY, Moline, IL (US)

( * ) Notice: Subject to any disclaimer, the term of this patent is extended or adjusted under 35 U.S.C. 154(b) by 544 days.

(21) Appl. No.: 17/240,459

(22) Filed: Apr. 26, 2021

(65) Prior Publication Data
US 2022/0322604 A1 Oct. 13, 2022

(30) Foreign Application Priority Data
Apr. 8, 2021 (EP) .................................. 21167466

(51) Int. Cl.
| | | |
|---|---|---|
| A01D 47/00 | (2006.01) | |
| A01D 34/835 | (2006.01) | |
| A01D 45/02 | (2006.01) | |
| A01D 61/00 | (2006.01) | |

(52) U.S. Cl.
CPC ......... *A01D 47/00* (2013.01); *A01D 34/8355* (2013.01); *A01D 45/021* (2013.01); *A01D 61/006* (2013.01)

(58) Field of Classification Search
CPC ...... A01D 47/00; A01D 34/835; A01D 45/02; A01D 61/00
See application file for complete search history.

(56) References Cited

U.S. PATENT DOCUMENTS

| | | | | |
|---|---|---|---|---|
| 2,210,973 | A * | 8/1940 | Coultas | A01D 45/028 460/28 |
| 3,333,405 | A | 8/1967 | Bulin | |
| 3,350,863 | A | 11/1967 | Ashton et al. | |
| 3,462,928 | A | 8/1969 | Schreiner et al. | |
| 5,237,804 | A * | 8/1993 | Bertling | A01D 43/082 56/60 |
| 6,298,643 | B1 * | 10/2001 | Wuebbels | A01D 43/082 56/60 |
| 7,905,079 | B2 | 3/2011 | Wolters et al. | |

(Continued)

FOREIGN PATENT DOCUMENTS

| | | | | |
|---|---|---|---|---|
| DE | 19531918 A1 * | 3/1997 | ........... | A01D 43/082 |
| DE | 19601421 C2 | 10/1998 | | |

(Continued)

OTHER PUBLICATIONS

Extended European Search Report and Written Opinion issued in European Patent Application No. 21167466.8, dated Oct. 4, 2021 (05 pages).

*Primary Examiner* — Arpad Fabian-Kovacs

(57) ABSTRACT

A header for harvesting stalk-like plants includes a number of gatherer assemblies arranged side by side for cutting off and conveying plants to a picking device arranged downstream of the gatherer assemblies. The picking device extends transversely to a direction of travel over the entire working width of at least one half of the header and includes a picking gap and stalk roll below the picking gap to separate fruits from the plants and to deliver them for a separate utilization.

17 Claims, 8 Drawing Sheets

(56) References Cited

U.S. PATENT DOCUMENTS

| | | | | |
|---|---|---|---|---|
| 8,468,790 | B2 * | 6/2013 | Grobmeier | A01D 43/082 56/503 |
| 9,198,351 | B2 * | 12/2015 | Tilly | A01D 45/021 |
| 9,578,804 | B2 * | 2/2017 | Gessel | A01D 45/021 |
| 10,668,547 | B2 * | 6/2020 | Lutz | B23D 61/021 |
| 2010/0300057 | A1 * | 12/2010 | Luetke-Harmann | A01D 45/021 56/119 |
| 2018/0020617 | A1 * | 1/2018 | Weitenberg | A01D 34/8355 56/503 |
| 2018/0184592 | A1 * | 7/2018 | Lehman | A01D 45/021 |

FOREIGN PATENT DOCUMENTS

| | | | | |
|---|---|---|---|---|
| DE | 19734747 | A1 | | 2/1999 |
| DE | 10026495 | A1 | | 11/2001 |
| DE | 10258013 | A1 * | 6/2004 | A01D 43/082 |
| DE | 102005021792 | A1 | | 11/2006 |
| DE | 102006048659 | A1 * | 5/2008 | A01D 43/082 |
| DE | 102007035791 | B3 * | 3/2009 | A01D 43/082 |
| DE | 102007038276 | B3 | | 3/2009 |
| DE | 102007038274 | B3 | | 4/2009 |
| DE | 102009051053 | A1 | | 12/2010 |
| DE | 102011051792 | A1 | | 1/2013 |
| DE | 102012106603 | A1 * | 5/2014 | A01D 45/021 |
| DE | 102013209466 | A1 * | 11/2014 | A01D 43/082 |
| DE | 102013106197 | A1 | | 12/2014 |
| DE | 102017223173 | A1 * | 6/2019 | A01D 34/8355 |
| DE | 102019007585 | A1 * | 5/2021 | A01D 45/021 |
| DE | 102020202976 | A1 * | 9/2021 | A01D 45/021 |
| DE | 102021120012 | A1 * | 3/2022 | A01D 34/74 |
| EP | 0134832 | A1 | | 3/1985 |
| EP | 1000533 | A1 * | 5/2000 | A01D 45/021 |
| EP | 1021944 | A1 | | 7/2000 |
| EP | 1305998 | A1 * | 5/2003 | A01D 45/021 |
| EP | 1362504 | A1 * | 11/2003 | A01D 41/144 |
| EP | 1428423 | A1 * | 6/2004 | A01D 45/021 |
| EP | 1911343 | A1 * | 4/2008 | A01D 43/082 |
| EP | 1767085 | B1 * | 8/2008 | A01D 43/082 |
| EP | 2255610 | A1 * | 12/2010 | A01D 45/021 |
| EP | 2545762 | A1 * | 1/2013 | A01D 45/021 |
| EP | 2923556 | A2 * | 9/2015 | A01D 45/021 |

* cited by examiner

HEADER FOR HARVESTING STALK-LIKE PLANTS WITH A PICKING GAP ORIENTED TRANSVERSELY TO THE DIRECTION OF TRAVEL

RELATED APPLICATIONS

This claims priority to EU Application No. 21167466.8, titled Header for Harvesting Stalk-like Plants with a Picking Gap Oriented Transversely to the Direction of Travel, filed Apr. 8, 2021, which is hereby incorporated by reference in its entirety.

FIELD OF THE DISCLOSURE

The disclosure relates to a header for harvesting stalk-like plants with a picking gap lying transversely to the direction of travel.

BACKGROUND OF THE DISCLOSURE

From the state of the art, a variety of headers with picking equipment are known, which are used for the harvesting of plants with fruits (e.g. corn or maize with ears or cobs).

For the harvest of such plants, a self-propelled or pulled harvester is moved over a field, having a harvesting header (picker) taking in the plants in the field, if necessary after separating the upper parts of the plant from a stump remaining in the soil, and transporting the stalks with fruit with the aid of feed elements and/or due to the forward movement of the harvesting header to a picking device. The picking device usually comprises a gap formed between two picking plates, the gap width of which generally being adjustable to the diameter of the stalk. The stalk, but not the fruit, can be drawn in, so that the fruit is separated from the plant when it passes through. The draw-in is performed by oppositely rotating stalk rolls, which are arranged below the picking gap and pull the stalk between themselves downwards. The fruits are removed from the area of the picking gap after being picked by the feed elements and/or cross-conveyors of the harvesting header and processed in the harvester (usually a combine harvester or forage harvester) and the stalks are crushed by knives of the stalk rolls or a stalk shredder arranged downstream from the stalk rolls. Since the plants to be harvested are planted in rows, common harvesters drive along these rows across the field and their picking units, each of which assigned to a respective row of plants, can be adjusted along the width of the harvesting header and thus adjusted to different distances of the rows.

Usually, the picking gap and the stalk rolls extend in the forward direction and chain conveyors are arranged above the picking gap (U.S. Pat. No. 3,462,928 A) or conveyors rotating around the vertical axis (U.S. Pat. No. 7,905,079 B2) serve as feed elements. Since the picking gap extends forward, such pickers build relatively long and shift the center of gravity of the combination of the harvesting header and harvesting machine relatively far to the front.

Another type of picker is similar to a cutting platform for the grain harvest, i.e. it comprises a knife bar for cutting off the plants and a reel to convey them backwards, while the picking gap is formed by successively arranged pairs of counter-rotating rods extending over the width of the picker, which pull the plant stalks downwards, but separate the fruits (cobs or ears) from them and feed the fruits via a cross-conveyor auger to the feeder house of the combine harvester (U.S. Pat. No. 3,333,405 A). However, this arrangement has not prevailed in practice, probably due to problems in the acceptance of the plant stalks by the stalk rolls and in the transfer of the fruit to the cross-conveyor auger.

In the prior art there are also approaches to orient the picking gap transversely to the forward direction of the picker. Reference is made, for example, to U.S. Pat. No. 3,350,863 A, EP 0 134 832 A1. DE 197 34 747 A1, DE 100 26 495 A1. DE 10 2005 021 792 A1, DE 10 2009 051 053 A1, DE 10 2011 051 792 A1 and DE 10 2013 106 197 A. The row units of the pickers each comprise a driven conveyor, which works row-dependently or row-independently and gathers the plant stalks and fed them to the picking gap in which they are drawn downwards. The plant stalks need to be deflected by 90° to introduce them into the cross-oriented picking gap.

A disadvantage of the previous pickers, whether with picking gaps arranged in the forward direction or transversely to the forward direction, is particularly noticeable in the harvest of downed crop, since the collection of not vertically standing plant stalks by the conveyor and the transfer to the picking gap as well as the reception and drawing in of the plant stalks by the stalk rolls is problematic. In addition, finite picking gaps are provided in each row unit. Under unfavorable conditions, a plant reaches the end of the picking gap before it has been completed pulled in. As plants continue to follow, at the end of the picking gap, there may be crop congestions and blockages. All this leads to a hindrance to the flow of goods and, under circumstances, to the loss of crop.

SUMMARY OF THE DISCLOSURE

The present disclosure has the objective to provide a header in the form of a picker, in which the above-mentioned disadvantages are avoided or at least occur in a reduced form.

A header for harvesting stalk-like plants is provided with a number of gatherer assemblies arranged side by side to the side for cutting off and conveying plants to a picking device arranged across the direction of travel and extending over the entire working width of at least a half of the header, the picking device comprising a picking gap and stalk rolls arranged below the picking gap to separate fruit stands from the plants and to deliver them for a separate utilization. The header is hence equipped with a continuous picking gap extending transverse to the direction of travel, through a half of the header or the entire header, such that the intake of the harvested material is not hindered by the fact that it is interrupted by an end of a picking gap, at which the plants can jam. Beneath the picking gap are arranged two oppositely rotating stalk rolls, transverse to the direction of travel, extending along the whole header, which also contribute due to their continuity to ensure that the plants are safely fed in.

As a result, a safe removal of the plants from the front-side harvesting area, which is equipped with row dependent or row independent gatherer assemblies, and a reliable transfer of the plant stalks to the downstream picking devices as well as a continuous conveying of the goods even with downed and thus crossed stalks are ensured.

The gatherer assemblies can each comprise an infeed conveyor and an (optional) intermediate conveyor, wherein the infeed conveyor is rotating around the vertical axis and configured to cut off the plants and convey the cut plants into an arc-shaped conveyor channel. The optional intermediate conveyor can be provided downstream the infeed conveyor to convey the plants along the conveyor channel and transfer them to the picking device. The intermediate conveyor may also be dispensed with altogether. However, it allows, with a given row spacing of the plants to be harvested and thus limited diameter of the infeed conveyor, by a lateral offset of its axis of rotation with respect to the axis of rotation of the feed conveyor, a further movement of the lower end of the plant to the outside than it would be possible only by the infeed conveyor. The said movement leads to a tilt of the upper part of the plant inwards, towards the center of the header (or in another embodiment, which is not shown in the figures, outward), which simplifies their entry into the picking device.

The infeed conveyor can comprise a lower feed disc and an upper feed disc, wherein the lower feed disc is equipped with outward-pointing, forward curved fingers, which cuts the plants in conjunction with a fixed counter knife below the lower feed disc, while the upper feed disc, arranged coaxially to the lower feed disc, is provided with teeth moving over the conveyor channel. The fingers of the lower feed disc can be provided at the trailing edge with upwards bars.

Rear of the intermediate conveyor, a finger roller may be arranged, which is driven around a rotation axis extending transverse to the direction of travel and is provided with a finger mounted eccentric to the axis of rotation, which moves over the end area of the conveying channel at least partially. Hence, in order to further increase the stalk transfer to the picking device, a third conveyor in the form of the finger roller with an axis parallel to the stalk rolls is arranged behind the first two infeed elements. The conveying channel may be formed in its end area in such a way that the end area extends perpendicular to the picking gap or includes an acute or blunt angle with the picking gap. The third conveyor moves over the end area of the conveyor channel and passes the stalk directly to the stalk rolls without releasing it before it is pulled in. The stalk is thus clamped between the stalk rolls between at least one of the stalk rolls and the finger roller during the introduction. The finger roller can be equipped with protruding bars to improve the indentation of the plant stalk.

The rotational speeds and numbers of the elements of the feed conveyor, the intermediate conveyor and the finger roller used to convey the plants can be dimensioned and synchronized in such a way that the plants are conveyed at a constant speed over the entire length of the conveyor channel and the finger of the finger roller cooperates with a plant exactly when it enters through the action of the intermediate conveyor into the end area of the conveyor channel adjacent to the picking gap and pulls the plant downwards to insert it between the stalk rolls Thus, the feed conveyor, the intermediate conveyor and the finger roller are synchronously coordinated, so that an unproblematic stalk transfer between the three conveyor elements is ensured.

The picking gap may be formed between a rear end of a cover plate arranged above the conveying assembly and the beginning of a cross conveyor auger floor of the cross conveyor, wherein coils of the cross conveyor auger are arranged above the picking gap. By adjusting the position of the cross-conveyor auger bottom in the direction of travel, the picking gap can be adjustable in its width. The cross conveyor auger extending into the space above the picking gap allows that the stalk can be pulled down past the envelope circle of the cross conveyor auger of the cross conveyor, while the edged cover plate forms a counter bearing for the cross conveyor auger, such that the fruits (e.g. corn cobs) can be transported away.

In an advantageous embodiment of the disclosure, the header, which comprises a number of gatherer assemblies mounted side-by-side and the picking device, can be folded from a harvest configuration into a compact transport configuration, wherein it contains in particular a center part and two side parts, which can be folded on to the center part, wherein the stalk rolls at the folds can be separated (decoupled) at the folds and are supported both at the center part and at the side parts. In a one-piece, non-foldable header, the stalk rolls could each extend in one piece over the entire width and be rotatably mounted only on the side walls, although even with such embodiment intermediate bearings of the stalk rolls between the side walls would be conceivable.

An upwardly extending rear panel of the header can be designed in such a way that it can be folded forward and down for transport and allows protection for divider tips when folded down. The rear panel can be sized such high that the plants cannot fall over the rear of the header. The rear panel can be in a line with the picking gap, so that the drawn-in plants cannot fall backwards. In the case of a foldable header, the rear panel can consist of a central part and two side parts.

Above the gatherer assemblies, roof-shaped hoods can be arranged, which together with a cross-conveyor auger floor form a transverse recess. Also, adjacent hoods above the conveying channels can form funnel-shaped recesses.

Below the stalk rolls, a stalk chopper and below the stalk chopper, a separating plate may be arranged, under which a stalk shredder is arranged, so that in a subsequent operation with the same header in a further advantageous embodiment also the stalks of the harvested plants can be crushed and distributed on the field by the stalk chopper, while the stalk shredder chops the plant stubbles. It would also be conceivable to transport the crushed stalks away in order to collect them and to use them separately (see DE 196 01 421 C2). In a further advantageous embodiment of the disclosure, the stalk chopper may be formed with an upward inclination, so that an approximately parallel separating plate can be arranged to convey cut material on this, which also forms a free space for the stalk shredder.

BRIEF DESCRIPTION OF THE DRAWINGS

In the following, the disclosure is explained in more detail with reference to the adjacent drawings on the basis of preferred embodiments.

It shows.

DETAILED DESCRIPTION OF THE DRAWINGS

Figure 1:
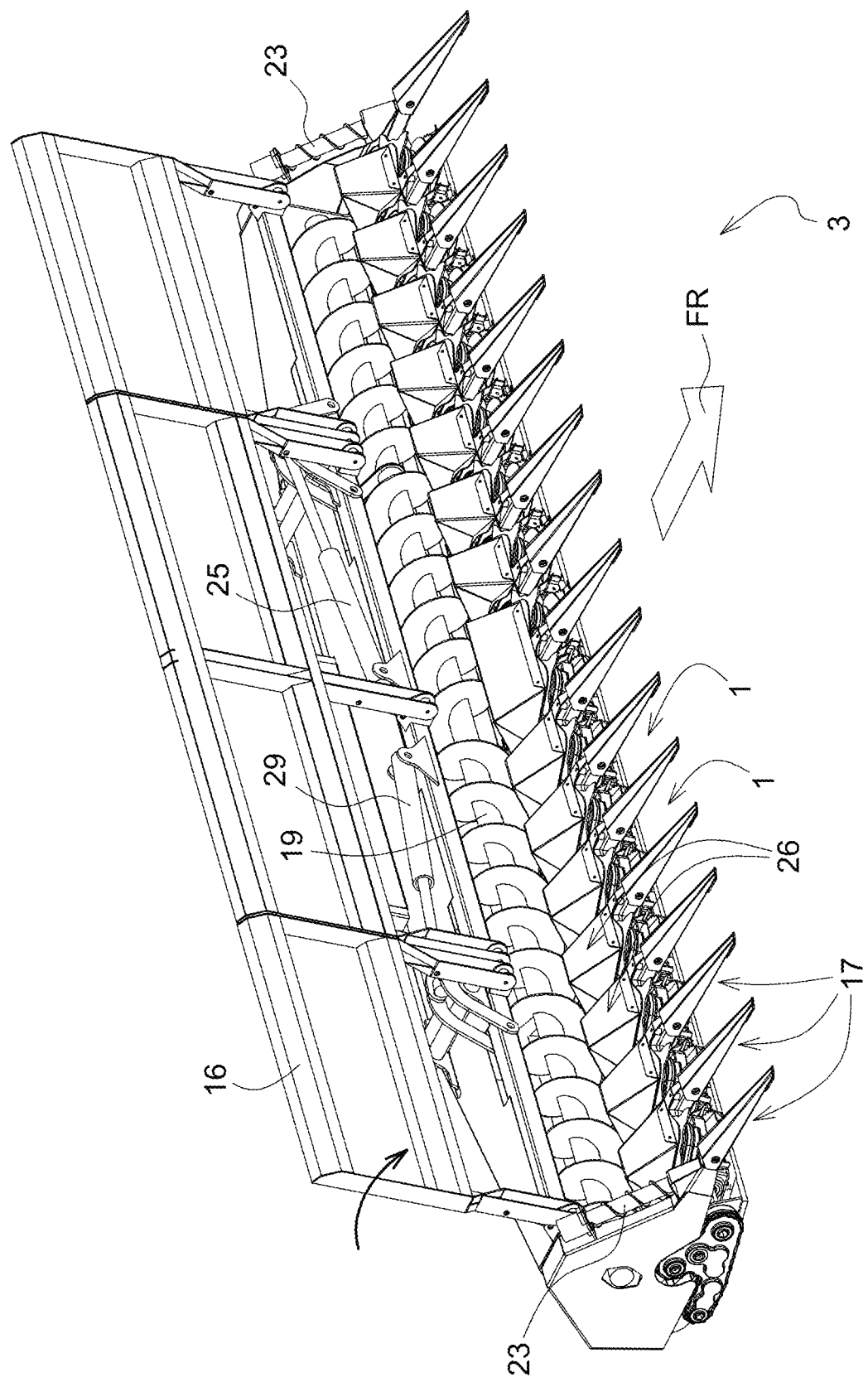
FIG. 1 a perspective view of a picker header for the harvesting of stalk-like plants, FIG. 2 a view of a section of the header with partially removed cover plates and hoods from above, FIG. 3 a view according to FIG. 2 with attached hoods, FIG. 4 a view on a part of the header from below, FIG. 5 a vertical section through the header, FIG. 6 a vertical section through a header equipped with a stalk shredder, FIG. 7 an enlarged part of FIG. 5, FIG. 8 an enlarged cutout from FIG. 3, and FIG. 9 a perspective view of a finger roller.

FIG. 1 shows a schematic representation of a header 3, which is embodied as a picker for stalk-like harvesting material, such as corn or maize, which can be connected in its rear area to a combine harvester or forage harvester (not shown). The header 3 comprises a supporting frame on which a number of driven gatherer assemblies are provided for drawing-in and conveying plants standing in the field. Between the gatherer assemblies respective divider tips 17 are arranged. The frame also carries a cross-conveyor auger 19, which conveys the fruits (ears) to the center of the header 3 after they were removed from the stalks by picking unit provided at the rear of the gatherer assemblies. At the center of the header 3, the fruits are transferred by an opening in the rear wall of the header 3 to an feeder house or infeed conveyor of the self-propelled harvesting machine in the form of a combine harvester or forage harvester (not shown) which supports the header 3 and moves the header 3 in the harvesting operation in a direction FR over a field.

The header 3 comprises a left and a right half, which are symmetrically designed to its vertical longitudinal center plane. The header 3 can be folded in a known manner (see EP 1 021 944 A1) by actuators 29 into a compact transport position, in which side parts are folded upwards over the center part, after a rear wall 16 has been moved by an actuator or by hand to a position in which it overlies and protects the divider tips 17.

On the tops of the side walls of the header, stalk lifter augers 23 are attached.

Figure 2:
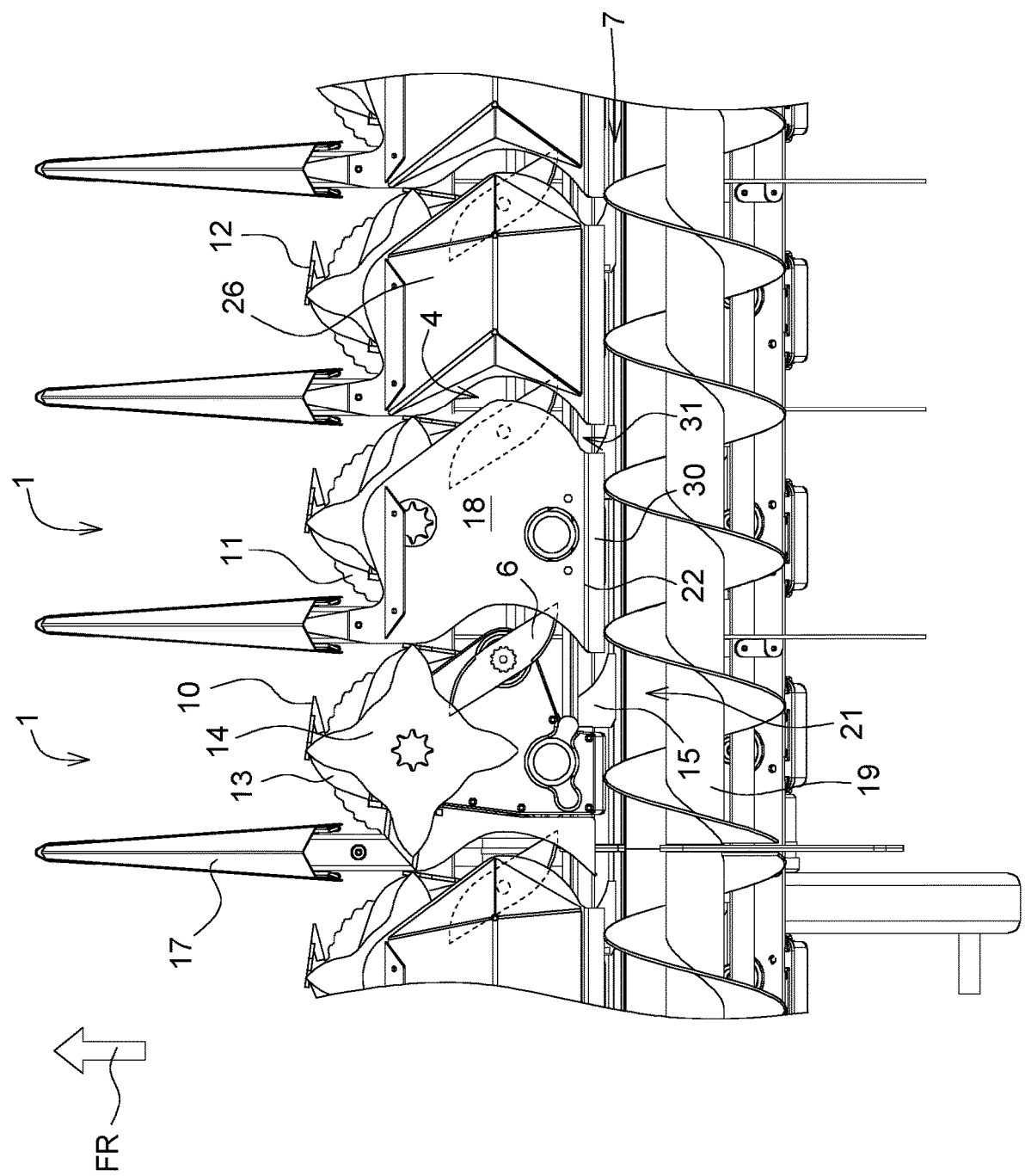

FIG. 2 shows a detailed view of the header 3, partly without cover 26 and without cover plate 18 in the top view, to allow a view of the underlying parts. In a harvesting area 1, the divider tips 17 initially divide the plants located in this area into different harvesting areas spaced side-by-side, since the harvester moves in the direction FR.

In the harvesting area 1 then an infeed conveyor 5 captures the stalks and guides them into an outwardly curved, arc-shaped conveyor channel 4, laterally bordered by cover plates 18 under which an infeed conveyor 5 and an intermediate conveyor 6 are arranged.

The infeed conveyor 5 comprises a lower feed disc 13 (see FIGS. 2 to 5) and an upper feed disc 14. The lower feed disc 13 cuts the plants off the stubbles remaining in the soil. For this purpose, the lower feed disc 13 is equipped with outward-pointing, forward curved fingers 10, which cut the plants in conjunction with a fixed counter knife 11 arranged below the lower feed disc 13. A cutting edge may be formed at the forward edge of the fingers 10 and/or at the counter knife 11 (possible embodiments for this can be found in DE 10 2007 038 274 B3 and DE 10 2007 038 276 B3). However, it would also be conceivable to provide the counter knife 11 with cutting edges and let it rotate and to design the lower feed disc 13 only as a conveyor.

The fingers 10 hold the stalk together with the upper feed disc 14, which rotates around the same (approximately vertical) axis. The stalk is also held on the lower feed disc 13 by a web 12 extending upwards on the rear edge of the finger 10. The stalk is conveyed in the direction of the conveyor channel 4 and through the conveyor channel 4 by the action of outer teeth of the upper feed disc 14. The forward ends of the fingers 10 run ahead of the corresponding teeth of the upper feed disc 14 slightly, which allows to provide no further means between the divider tips 17 for inserting the stalks into the feed conveyor 5, such as divider guides and inserting fingers attached to them, since the plants are first received by the fingers 10 and only afterwards by the teeth of the upper feed disk 14. The trailing ends of the webs 12 are approximately where the fingers 10 pass from a forward, approximately tangential-running area into an inward-facing area. Due to the straight running webs 12, the removal of the stalks from the feed conveyor 5 is simplified by the intermediate conveyor 6, without the stalk being bent or flexed to a greater extent.

Downstream and rear of the infeed conveyor 5 an intermediate conveyor 6 is arranged, whose rotation axis is oriented parallel to that of the infeed conveyor 5. The intermediate conveyor 6, which rotates synchronously to and in the direction of rotation of the feed discs 13 and 14 of the infeed conveyor 5 in the direction of rotation of the feed infeed conveyor 5, receives the plant stalks from the infeed conveyor 5 and transports them further in the direction of a picking gap 7 which is extending transversely to the direction of travel FR and over the entire working width of the header 3, by swiping its two upper wings and its two lower wings over conveyor channel 4. The rotary axis of the intermediate conveyor 6 is offset outwards compared to the axis of rotation of the infeed conveyor 5. The rotation directions of intermediate conveyor 6 and infeed conveyor 5 are the same, although it would also be conceivable to choose them differently.

The picking gap 7 is formed by the end of a downward edged, rear surface 22 of the cover plate 18 and the forward end of a cross-auger floor 21 of the cross conveyor 20. The auger 19 of the cross conveyor 20 extends so far forward so that its coils are also vertically above the picking gap 7, but not in front of it.

Figure 9:
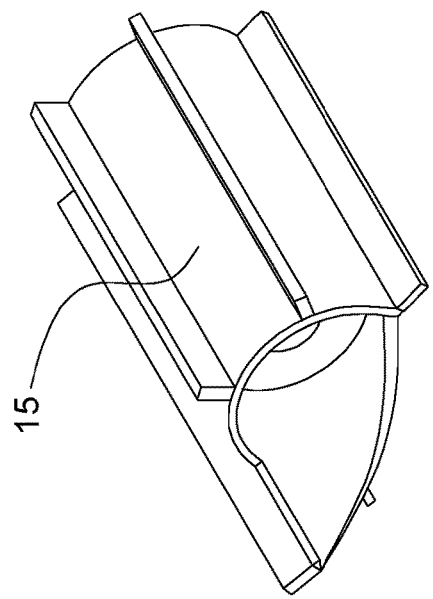

In the embodiment shown, the conveyor channel 4 is curved in its rear end area 31, i.e. it extends in an arc in the direction towards the center of the header 3, while it extends at the very rear end in to the forward direction FR. There is a further (third) conveyor arranged, which is carried out here as a finger roller 15, which moves partially over the end area 31 and transfers the stalk directly to the stalk rolls 2 arranged below the picking gap 7, without releasing the stalk before the stalk is drawn in by the stalk rolls. The finger roller 15 comprises a finger which is preferably flat, narrowing towards the free end and having an external edge extending parallel to the axis of rotation. The finger is arranged eccentrically to a rotation axis around which the finger roller 15 turns (cf. FIG. 9). This axis of rotation extends horizontally and transversely to the forward direction FR. Unlike shown, the conveyor channel 4 (also) could extend in its rear end area 31 arc-shaped, while the finger of the finger roller 15 would then be in the arc-shaped end area 31.

Figure 3:
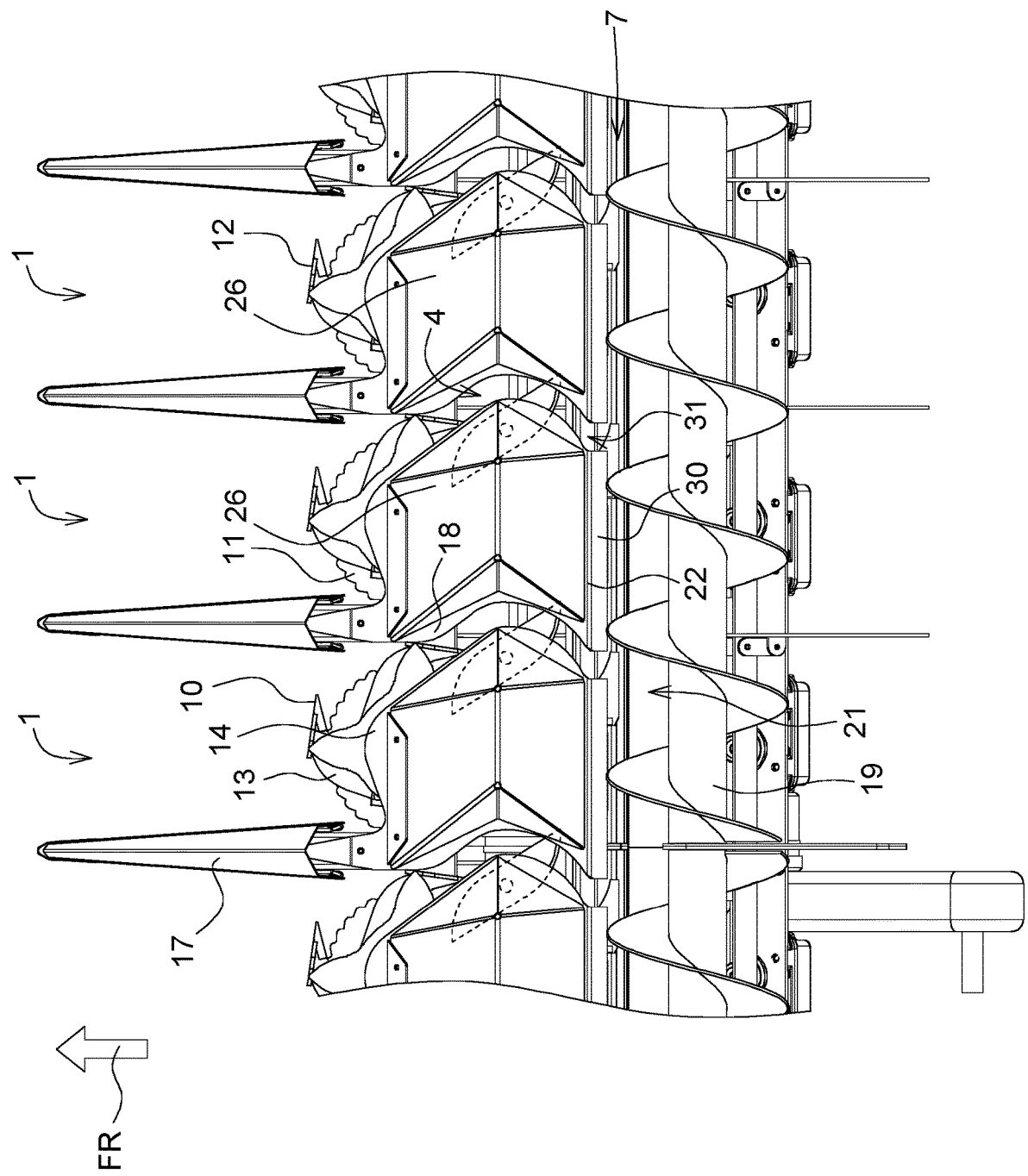

FIG. 3 shows the same area as FIG. 2, supplemented with hoods 26, which are arranged in such a way that their rear surfaces together with the cross-conveyor auger floor 21 of the cross conveyor 20 form a recess, in which the fruits separated from the plant stalks by the picking unit (and possibly fruits falling from the plants) are transported away. The cover hoods 26 are designed in a roof shape, i.e. include a front section sloping rearwards to an upper edge and rear section behind the edge sloping downwards. On both sides, the hoods 26 are also sloped. Thus, each two adjacent hoods 26 form a funnel-shaped recess above the conveying channel 4, which follows its arc shape at least approximately. Instead of the straight lateral surfaces of the hoods 26 shown in the figures, these lateral surfaces could also be curved, analogous to the arc shape of the conveyor channel 4.

Figure 4:
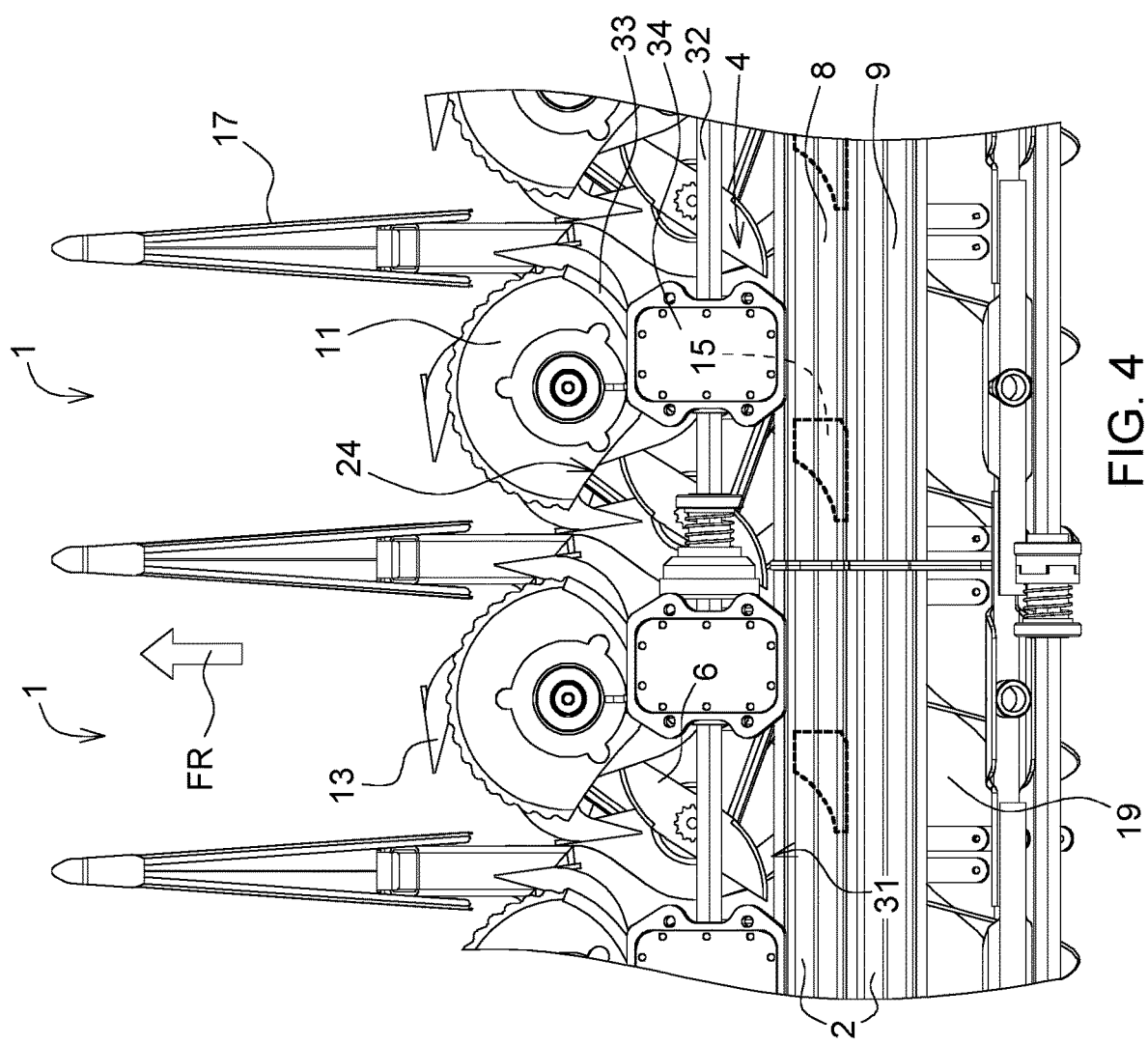

FIG. 4 shows a view of the area of the header 3 shown in FIGS. 2 and 3 from the bottom, which also represents the counter knife 11 with an area 24 interrupted at the rear edge. The counter knife 11 therefore does not form a complete circle but is interrupted at the back to save material. At the same time, the view of FIG. 4 allows a better view of the intermediate conveyors 6 and the stalk rolls 2. Material wrapped around the tooth 10 is cut at the counter knife 11 or a cutting element 33 connected thereto (see FIG. 4), which provides a kind of clearing function to free the tooth 10 from accumulated material. The counter knife 11 can adapt to the lower feed disc 13, e.g. by means of a (plate) spring, which biases the counter knife 11 upwards or the feed disc 13 downwards.

Figure 5:
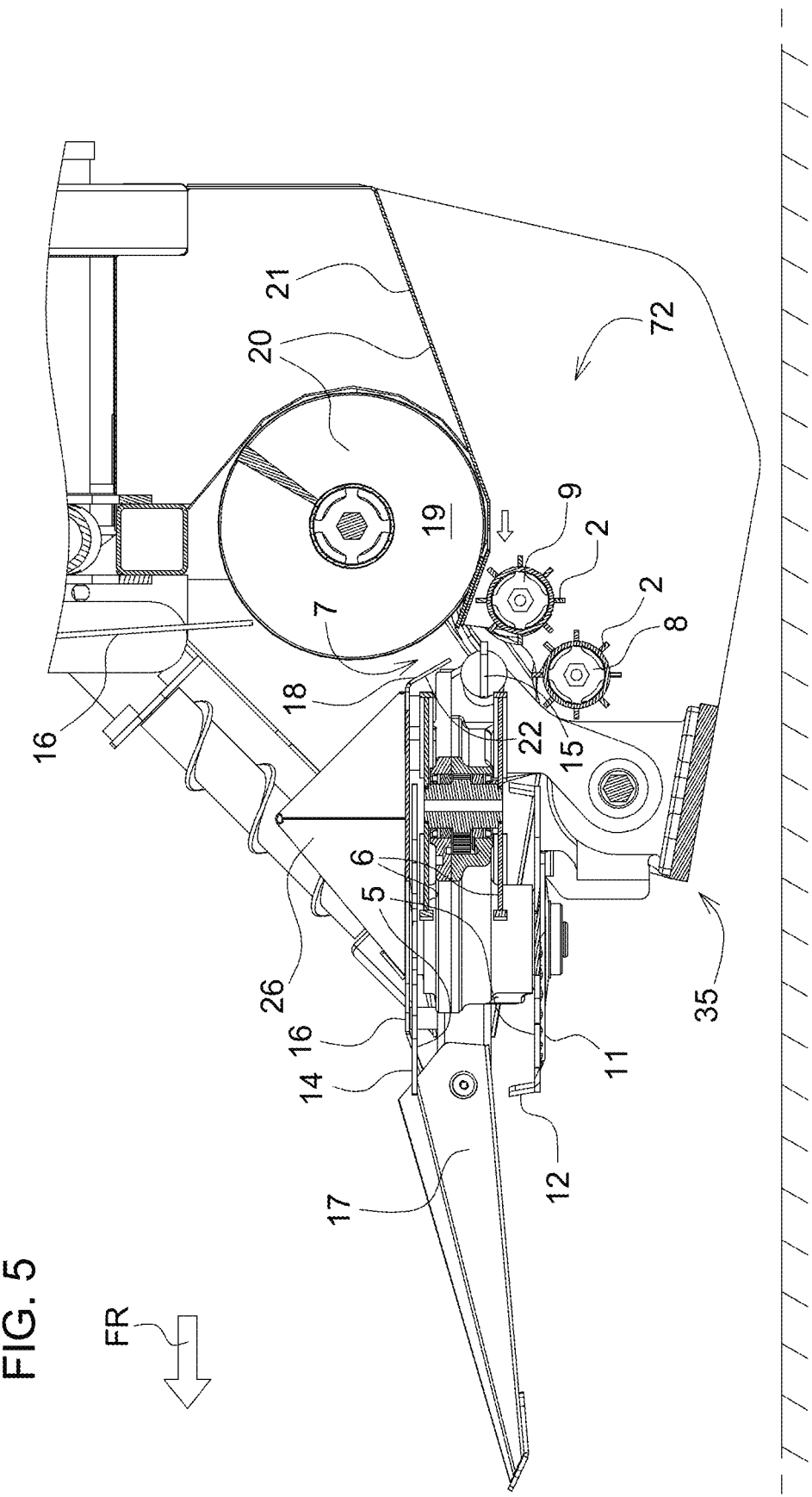

FIG. 5 shows a schematic side view, from which it is apparent that the stalks in the front harvesting area 1 are drawn in by the infeed conveyor 5 and at the same time are cut off in conjunction with the counter knife 11 and then passed to the intermediate conveyor 6 rotating synchronously in the same direction. Due to the outward-facing shape of the conveyor channel 4, the plants with their tops, due to their inertia, tilt inwardly, to the center of the header 3. This makes it easier to accept them by the stalk rolls 2 and creates a flow of plants in which the plants cannot intersect and thus hook. The upper edge of the front stalk roll 8 is arranged in this advantageous embodiment so that it lies almost immediately below the counter knife 11, so that the lower area of the cut stalk can be passed directly to the front stalk roll 8 due to the gravity acting on the plant, as soon as the stalk leaves the conveying channel 4. The rear stalk roll 9 is arranged so that it lies above the front stalk roll 8, so that the cut stalk is conveyed against it in order to further improve the transfer of the cut stalks to the stalk rolls 2. It is however within the scope of the disclosure that the stalk rolls 2 are arranged on a horizontal plane, since the stalk moves due to gravity itself into the gap between the stalk rolls 2.

In order to further increase the transfer quality, behind the intermediate conveyor 6 is additionally arranged the finger roller 15, which takes over the stalk from Intermediate conveyor 6, wherein the finger of the finger roller 15 is arranged so that it takes over the plant in the curved end area 31 of the conveyor channels 4, which is not visible in this view, and presses the stalk into the gap between the stalk rolls 2. The (in this advantageous embodiment) downwards bent end of the cover plate 18 forms together with the front edge of the cross conveyor auger floor 21 of the cross conveyor 20 the picking gap 7, the size of which is adjustable by moving the sheet of the cross-conveyor auger floor 21 (in the direction of travel FR), be it by hand or against the force of one or more springs(s) or by an actuator controlled by the operator of the harvesting machine or automatically by means of a sensor-detected stalk diameter of the plants. The edged surface 22 of the cover plate 18 forms at the same time an abutment for the cross conveyor 20, i.e. it supports the cross-transport of the fruits by the cross conveyor auger 19.

The almost vertical, relatively far upwards extending rear wall 16 prevents that plant falls backwards beyond the rear wall 16.

Figure 6:
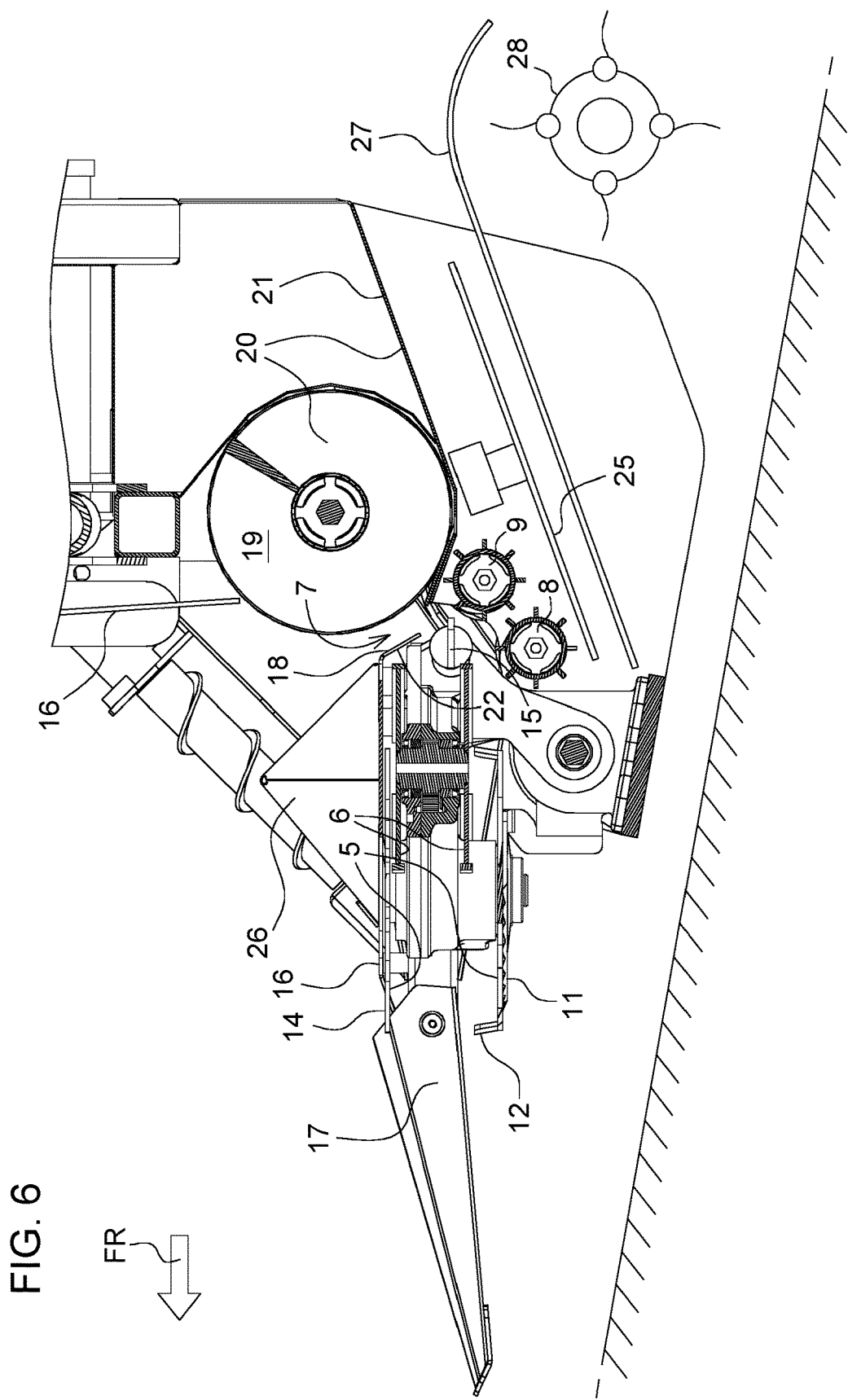

FIG. 6 shows a side view like FIG. 5 of an embodiment wherein a possible position of a stalk chopper 25 with separating plate 27 and a stalk mulcher 28 under the separating plate 27 is depicted. In FIG. 5, on the other hand, a stalk chopper 35 is arranged below the gatherer assembly. This stalk chopper 35 could be omitted in the embodiment according to FIG. 6, since there the stalk mulcher 28 takes over its task.

Figure 7:
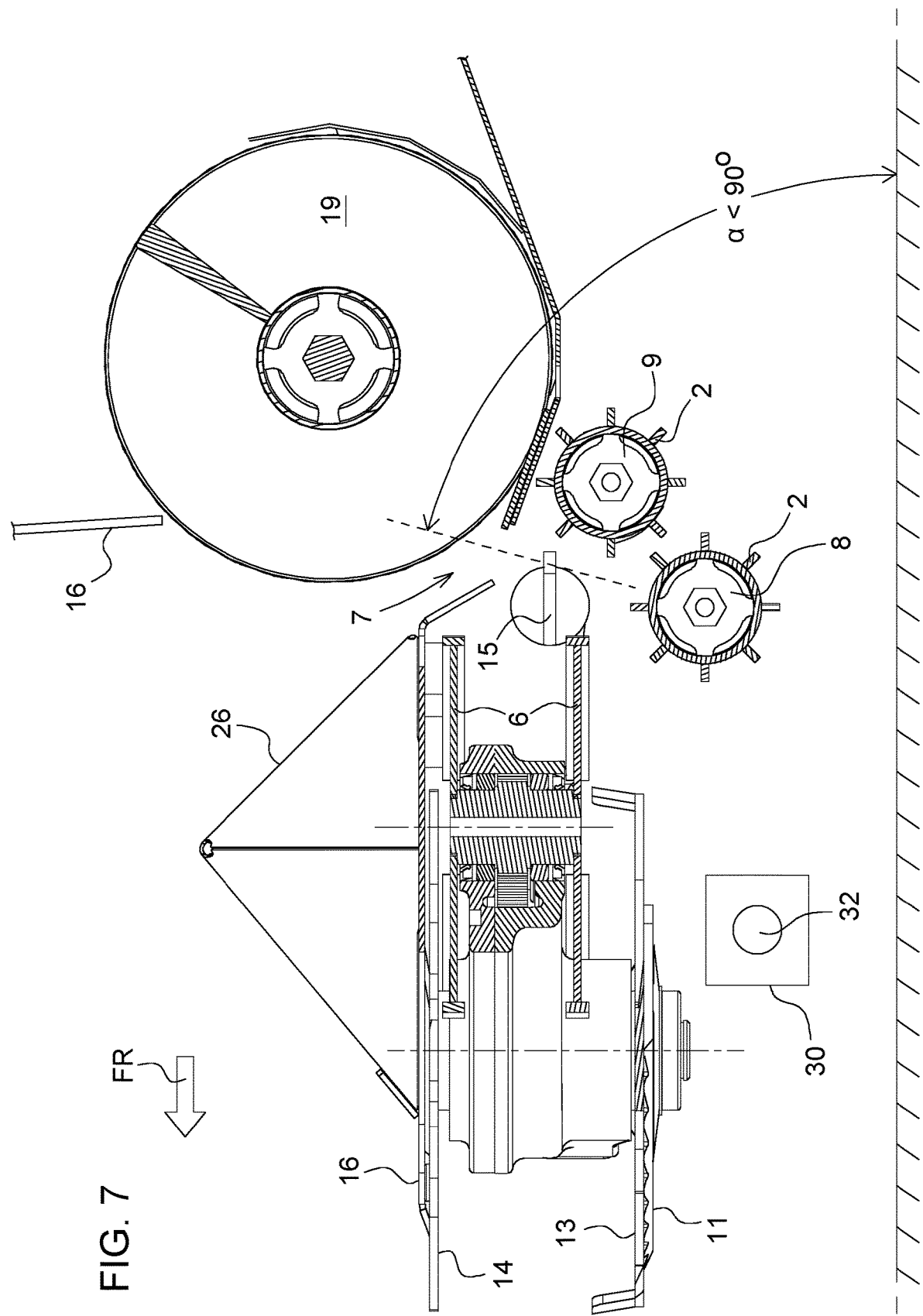

FIG. 7 shows a side view of an embodiment like FIG. 5, wherein the rearwardly inclined picking gap 7 is visible. In addition, a cross member 30 is shown, which extends between the side walls of the header 3 and which is used to support the gatherer assembly or the gearbox 34 intended for driving the latter, which gearboxes 34 can also drive the respective stalk chopper 35 assigned to the gatherer assembly. Within the cross member 30, a drive shaft 32 is arranged, which serves to drive the movable elements of the gatherer assemblies via the gearboxes 34. It would also be conceivable to drive the movable elements of the gatherer assemblies by electric or hydraulic motors, whose supply lines could be led through the cross member 30. In another embodiment, the gatherer assemblies could be assigned to a respective forward-facing member, which connects them to a transverse beam at the rear of the header 3 and accommodates a shaft and/or supply lines.

Figure 8:
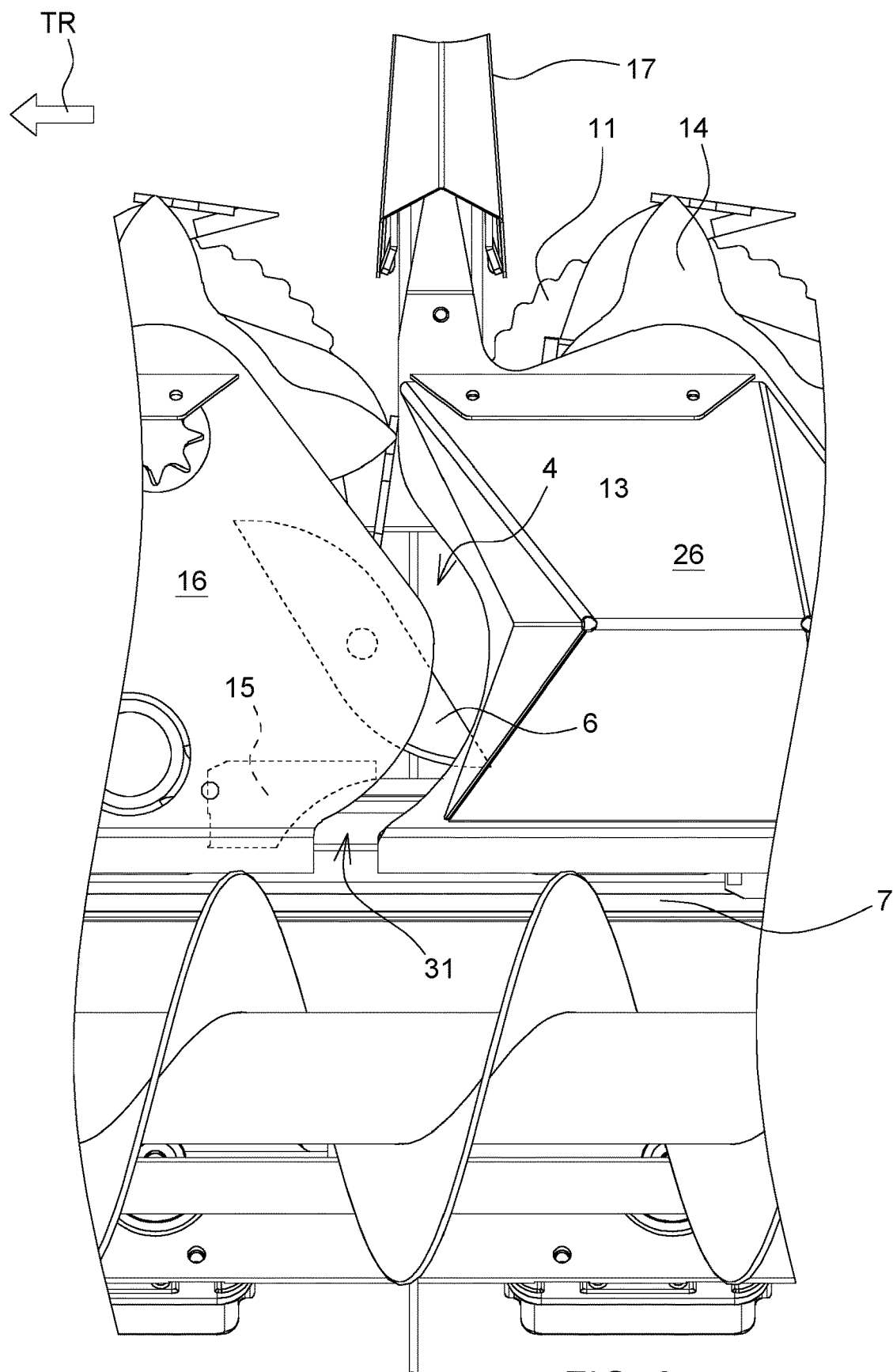

FIG. 8 shows a top view, wherein the curved end area 31 of the conveying channels 4 is shown, which covered by the finger roller 15, where the transport direction TR of the harvested material is shown.

After all this it is apparent that the header 3 comprises a number of row-independently working gatherer assemblies arranged side by side, which each comprise an infeed conveyor 5, an intermediate conveyor 6 and a finger roller 15. Divider tips 17 are arranged between the gatherer assemblies. The infeed conveyor 5 serves for cutting off the plant stalks and for conveying the cut plant stalk in and through the conveyor channel 4, which extends arched outwards and then inwards. The intermediate conveyor 6 takes over the plant stalk and feeds it to the end area 31, where it finally—with the assistance of the finger roller 15—enters the picking gap 7, below which the stalk rolls 2. i.e. the front stalk roll 8 and the rear stalk roll 9, are located, which feed the plant stalk downwards.

The finger roller 15, if this is in the direction of direction FR at the front reversal point, is covered to the top by the cover plate 18 (different from what is shown in FIG. 8, the intermediate conveyor 6 could extend approximately in the forward direction FR when the finger of finger roller 15 is in its frontmost position, while the infeed conveyor 5 would be turned a little to the left compared with respect to the position shown in FIG. 8). The stalk can now be conveyed by the intermediate conveyor 6 behind the finger roller 15. When the finger roller 15 turns, the stalk is pushed further back along the conveyor channel 4. The stalk is then clamped between the stalk rolls 2. It is no longer released in any position until the stalk is pulled into the picking gap 7. The plant is transported towards the center of the header 3 when it is drawn in by the stalk rolls 2, although dependent on the stalk inclination, e.g. in the case of downed crop, at least at the beginning of the draw-in process the plant could also move outwards. The speeds and dimensions of the parts of the gatherer assembly (infeed conveyor 5 and intermediate conveyor 6) and the finger roller 15, which are involved in the operation with the harvested material, also ensure that the individual plants are transported individually and transferred to the respective downstream conveyor without plants being trapped during transfer from one conveyor to the other.

The circumferential speeds of the parts of the finger roller 15 and the stalk rolls 2 engaging the harvested material are preferably at least approximate the same (while, for example, in the intermediate conveyor 6 the plant is conveyed initially and at the end further at the outside (and thus spaced from the rotation axis of the intermediate conveyor 6) than when it interacts with the intermediate conveyor 6 when the latter is approximately transverse to the direction FR, however, there also the conveying speed changes a little) in order to carry out the described transfer process as jerk-free and synchronously as possible. The rotational speed of the cross-conveyor auger 19 can be chosen in particular so that at each turn of the finger roller 15 exactly one coil (or an integer number of coils) passes past the finger roller 15, wherein the adjacent coil is not at the front, when a plant enters or can enter the picking gap 7. In addition, the conveying speeds of the gathering assembly are also chosen in such a way that the plants are conveyed with a constant speed over the length of the conveying channel 4 and the intermediate conveyor 6 is timed and speed-coordinated with the finger roller 15, as described above. These said speeds may be fixed or depend on the respective propulsion speed of the header 3.

The fruit (ear or cob) is separated at the picking gap 7 and transported by the cross conveyor auger 19.

The picking device 72 includes the picking gap 7 and stalk rolls 2, as shown in FIG. 5. The picking gap 7 and the stalk rolls 2 extend, without interruptions by any supports or struts (apart from possible supports of the stalk rolls 2 along their length at the header 3, and an optional interruption of the picking gap 7 in the center of the header 3 for example by a strut extending in the direction of travel or an arc-shaped turn to the rear of the pick gap at the center), over the entire working width of the header 3. This avoids that plant stalks, which are not exactly vertically in the field in unfavorable harvesting conditions (downed corn), although drawn in by the conveying assembly, are not optimally received by the stalk rolls 2 and thus not pulled down, accumulate at the end of a picking gap. By the almost endless picking gap 7 one achieves that these plants are nevertheless, be it at a point further to the center of the header 3 or at a further outward point, finally drawn in, possibly by the fact that a trailing plant or a plant coming in from the other side of the header 3 lead them down and they are taken in by the stalk rolls 2.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A header for harvesting stalk-like plants comprising a number of gatherer assemblies arranged side by side for cutting off plants and conveying the plants to a picking device arranged downstream of the gatherer assemblies, the picking device extending transversely to a direction of travel, the picking device including a picking gap and a stalk roll below the picking gap to separate fruits from the plants and to deliver them for a separate utilization, wherein the picking gap of the picking device continuously extends over at least one half of the header, and the picking gap is formed between a rear end of a cover plate arranged above the gatherer assembly and a front end of a cross conveyor auger floor of a cross conveyor.

2. The header according to claim 1, wherein the gatherer assemblies each comprise an infeed conveyor, the infeed conveyor rotating around a vertical axis and configured for cutting off the plants and for conveying the cut plants into an arc-shaped conveyor channel.

3. The header according to claim 2, wherein an intermediate conveyor is provided downstream of the infeed conveyor, which intermediate conveyor rotates around a vertical axis and is configured to convey the plants along the conveyor channel and pass them to the picking device.

4. The header according to claim 3, wherein the axis of rotation of the intermediate conveyor is offset sideways in relation to the rotary axis of the infeed conveyor.

5. The header according to claim 2, wherein the infeed conveyor has a lower feed disc and an upper feed disc, the lower feed disc is equipped with outward-facing, protruding curved fingers, which cuts the plants in combination with a fixed counter knife below the lower feed disc, wherein the upper feed disc is coaxially arranged to the lower feed disc and provided with teeth moving over the conveyor channel.

6. The header according to claim 5, wherein the fingers of the lower feed disc are provided at the trailing edge with upwardly directed webs.

7. The header according to claim 1, wherein coils of the cross-conveyor auger are arranged above the picking gap.

8. The header according to claim 1, further comprising cover hoods above the gatherer assemblies, which together with a cross conveyor auger floor form a recess.

9. The header according to claim 1, wherein below the stalk rolls a stalk chopper and below the stalk chopper a separating plate is arranged, under which a stalk mulcher is arranged.

10. The header according to claim 1, further comprising cover hoods above the gatherer assemblies, wherein adjacent cover hoods above the conveying channels form funnel-shaped recesses.

11. The header according to claim 8, wherein adjacent cover hoods above the conveying channels form funnel-shaped recesses.

12. A header for harvesting stalk-like plants comprising a number of gatherer assemblies and an intermediate conveyor, the gatherer assemblies arranged side by side for cutting off plants and conveying the plants to a picking device arranged downstream of the gatherer assemblies, the picking device extending transversely to a direction of travel, the picking device including a picking gap and a stalk roll below the picking gap to separate fruits from the plants and to deliver them for a separate utilization, wherein the picking device extends over at least one half of the header, the gatherer assemblies each comprise an infeed conveyor, the infeed conveyor rotating around a vertical axis and configured for cutting off the plants and for conveying the cut plants into an arc-shaped conveyor channel, wherein at the rear of the intermediate conveyor a finger roller is arranged, which is rotatable around a rotational axis oriented transverse to the direction of travel and is provided with a finger arranged eccentric to the axis of rotation, which finger moves at least partially over the end area of the conveyor channel.

13. The header according to claim 12, wherein the rotation speeds and numbers of the respective stalk-conveying elements of the infeed conveyor, the intermediate conveyor and the finger roller are dimensioned and synchronized in such a way, that the plants are conveyed at a constant speed over the entire length of the conveyor channel and that the finger of the finger roller acts with a plant exactly when it enters through action of the intermediate conveyor into the end area of the conveyor channel adjacent to the picking gap and the finger pulls the plant down to introduce the plant between the stalk rolls.

14. The header according to claim 12, wherein an intermediate conveyor is provided downstream of the infeed conveyor, which intermediate conveyor rotates around a vertical axis and is configured to convey the plants along the conveyor channel and pass them to the picking device.

15. The header according to claim 14, wherein the axis of rotation of the intermediate conveyor is offset sideways in relation to the rotary axis of the infeed conveyor.

16. The header according to claim 12, wherein the infeed conveyor has a lower feed disc and an upper feed disc, the lower feed disc is equipped with outward-facing, protruding curved fingers, which cuts the plants in combination with a fixed counter knife below the lower feed disc, wherein the upper feed disc is coaxially arranged to the lower feed disc and provided with teeth moving over the conveyor channel.

17. The header according to claim 16, wherein the fingers of the lower feed disc are provided at the trailing edge with upwardly directed webs.

\* \* \* \* \*